United States Patent
Chen et al.

(10) Patent No.: US 12,513,356 B2
(45) Date of Patent: Dec. 30, 2025

(54) PROJECTION SYSTEM, PROJECTION DEVICE AND CONTROL METHOD THEREOF

(71) Applicant: Coretronic Corporation, Hsin-Chu (TW)

(72) Inventors: Yu-Meng Chen, Hsin-Chu (TW); Yi Wei Hsu, Hsin-Chu (TW); Wei-Hsin Kan, Hsin-Chu (TW); Ssu-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/822,452

(22) Filed: Sep. 2, 2024

(65) Prior Publication Data
US 2025/0080794 A1 Mar. 6, 2025

Related U.S. Application Data

(60) Provisional application No. 63/536,501, filed on Sep. 5, 2023.

(30) Foreign Application Priority Data

Nov. 15, 2023 (CN) .......................... 202311523647.8

(51) Int. Cl.
H04N 21/432 (2011.01)
H04N 21/41 (2011.01)
H04N 21/422 (2011.01)

(52) U.S. Cl.
CPC ..... H04N 21/4325 (2013.01); H04N 21/4122 (2013.01); H04N 21/42203 (2013.01)

(58) Field of Classification Search
CPC .......... H04N 21/4325; H04N 21/4122; H04N 21/42203
See application file for complete search history.

(56) References Cited

U.S. PATENT DOCUMENTS 11,100,926 B2   8/2021   Lin et al.
11,206,372 B1 * 12/2021   Zhang ................ H04L 12/1813
(Continued)

FOREIGN PATENT DOCUMENTS

CN   107205075   9/2017
CN   108319171   7/2018
(Continued)

OTHER PUBLICATIONS

"Search Report of Europe Counterpart Application", issued on Feb. 5, 2025, p. 1-p. 10.
(Continued)

Primary Examiner — Thai Q Tran
Assistant Examiner — Jose M Mesa
(74) Attorney, Agent, or Firm — JCIPRNET

(57) ABSTRACT

A projection system, a projection device and a control method thereof are provided. The control method of the projection device includes following steps: receiving a standard command; converting the standard command into an original control code through a definition module of the projection device; determining whether an original control code meets at least one necessary parameter through an allocation module of the projection device; in response to the original control code meeting at least one necessary parameter, the allocation module enabling one player of the at least one player to play one media file of the at least one media file according to the original control code; and in response to the original control code not meeting the at least one necessary parameter, the allocation module generating a supplementary control code, and the allocation module enabling one player of the at least one player to play the one media file of the at least one media file according to at least one of the original control code and the supplementary control code.

24 Claims, 12 Drawing Sheets

(56) References Cited

U.S. PATENT DOCUMENTS

| | | | |
|---|---|---|---|
| 2009/0076821 A1 | 3/2009 | Brenner et al. | |
| 2011/0126104 A1* | 5/2011 | Woods | H04N 21/482 |
| | | | 725/86 |
| 2019/0132436 A1 | 5/2019 | Jang et al. | |
| 2020/0404048 A1* | 12/2020 | Glazer | H04L 67/52 |
| 2022/0286726 A1 | 9/2022 | Heo et al. | |

FOREIGN PATENT DOCUMENTS

| | | |
|---|---|---|
| CN | 108496343 | 9/2018 |
| CN | 110808041 | 2/2020 |
| CN | 110059224 | 8/2020 |
| CN | 116203853 | 6/2023 |
| JP | 2022112292 | 8/2022 |
| KR | 20140037519 | 3/2014 |
| TW | 202013141 | 4/2020 |
| TW | I718632 | 2/2021 |
| WO | 2017054122 | 4/2017 |
| WO | 2019177949 | 9/2019 |

OTHER PUBLICATIONS

Hsin-Ya Lai et al., "Projection System, Terminal Device, Projection Device and Control Method Thereof", Unpublished U.S. Appl. No. 18/784,932, filed Jul. 26, 2024, The specification, claims, and the drawings of the unpublished pending U.S. application have been stored in the Image File Wrapper (IFW) system.

"Office Action of Japan Related Application, Application No. 2024122331", issued on Jun. 24, 2025, p. 1-p. 6.

"Search Report of Europe Related Application, Application No. 24190662.7", issued on Dec. 13, 2024, p. 1-p. 11.

\* cited by examiner

PROJECTION SYSTEM, PROJECTION DEVICE AND CONTROL METHOD THEREOF

CROSS-REFERENCE TO RELATED APPLICATION

This application claims the priority benefit of U.S. provisional application Ser. No. 63/536,501, filed on Sep. 5, 2023, and China application serial no. 202311523647.8, filed on Nov. 15, 2023. The entirety of each of the above-mentioned patent applications is hereby incorporated by reference herein and made a part of this specification.

BACKGROUND

Technical Field

The disclosure relates to a display technique, and particularly relates to a projection system, a projection device and a control method thereof.

Description of Related Art

A current method of playing specific media by a projector is implemented by a user by manually operating the projector or manually operating an electronic device which is a data source of the media, so that the conventional operation of playing media through the projector is quite inconvenient.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection system, a projection device and a control method thereof, which are adapted to receive instructions of a user to control the projection device to play media files.

Additional aspects and advantages of the present disclosure will be set forth in the description of the techniques disclosed in the present disclosure.

In order to achieve one or a portion of or all of the objects or other objects, an embodiment of the disclosure provides a control method of a projection device including following steps: receiving a standard instruction; converting the standard instruction into an original control code through a definition module of the projection device; determining whether the original control code meets at least one necessary parameter through an allocation module of the projection device; in response to the original control code meeting the at least one necessary parameter, enabling a player of at least one player to play a media file of at least one media file by the allocation module according to the original control code; and in response to the original control code not meeting the at least one necessary parameter, generating a supplementary control code by the allocation module, and enabling the player of the at least one player to play the media file of the at least one media file by the allocation module according to at least one of the original control code and the supplementary control code.

In order to achieve one or a portion of or all of the objects or other objects, an embodiment of the disclosure provides a projection system including a cloud server and a projection device. The projection device is configured to receive a standard instruction generated by the cloud server. The projection device includes at least one player, a definition module, and an allocation module. The definition module is configured to convert the standard instruction to an original control code. The allocation module is configured to determine whether the original control code meets at least one necessary parameter. In response to the original control code meeting the at least one necessary parameter, the allocation module is configured to enable a player of the at least one player to play a media file of at least one media file according to the original control code. In response to the original control code not meeting the at least one necessary parameter, the allocation module is configured to generate a supplementary control code, and the allocation module enables the player of the at least one player to play the media file of the at least one media file according to at least one of the original control code and the supplementary control code.

In order to achieve one or a portion of or all of the objects or other objects, an embodiment of the disclosure provides a projection device including at least one player, a sound collecting device, and an allocation module. The sound collecting device is configured to receive an original instruction corresponding to an original control code. The allocation module is coupled to the player and the sound collecting device, and is configured to determine whether the original control code meets at least one necessary parameter. In response to the original control code meeting the at least one necessary parameter, the allocation module is configured to enable a player in the at least one player to play a media file in at least one media file according to the original control code. In response to the original control code not meeting the at least one necessary parameter, the allocation module generates a supplementary control code, and the allocation module is configured to enable the player in the at least one player to play the media file in the at least one media file according to at least one of the original control code and the supplementary control code.

Based on the above descriptions, the projection system, projection device and the control method thereof may receive a user instruction to control the projection device to operate the player and play the corresponding media file.

To make the aforementioned more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
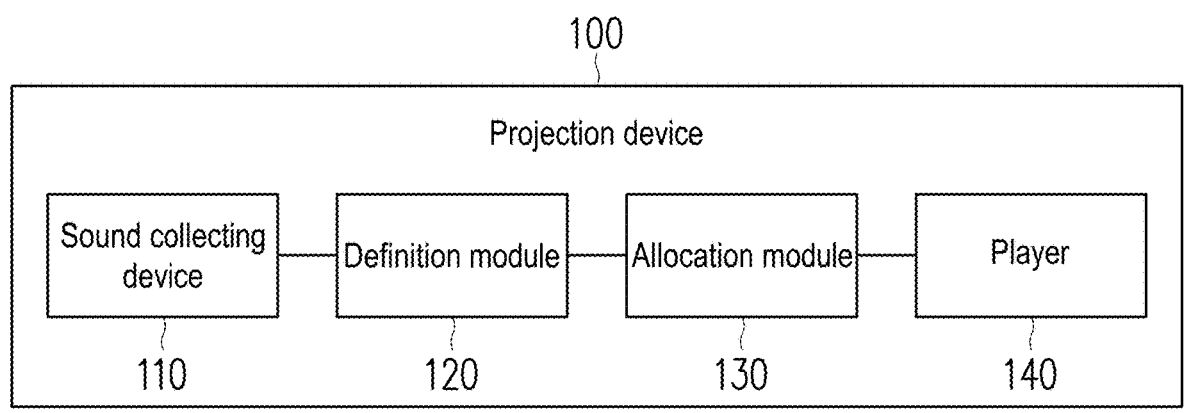
FIG. 1 is a schematic diagram of a projection device according to an embodiment of the disclosure.

FIG. 1 is a schematic diagram of a projection device according to an embodiment of the disclosure. Referring to FIG. 1, a projection device 100 includes a sound collecting device 110, a definition module 120, an allocation module 130 and a player 140. The definition module 120 is coupled to the sound collecting device 110 and the allocation module 130. The allocation module 130 is further coupled to the player 140. In an embodiment, the sound collecting device 110 may also be an independent device, and may be externally connected to the projection device 100, or may be provided in a terminal device. In the embodiment, the projection device 100 may further include a processor and a storage device. The storage device may store programs or plugins of the definition module 120, the allocation module 130, and the player 140. The processor may execute the programs or plugins of the definition module 120, the allocation module 130, and the player 140 to implement their functions.

In the embodiment, the processor may include, for example, a central processing unit (CPU), a graphics processing unit (GPU), or other programmable general-purpose or special-purpose microprocessor, digital signal processor (DSP), programmable controller, application specific integrated circuits (ASIC), programmable logic device (PLD), other similar processing devices or combinations of these devices. In the embodiment, the storage device may be, for example, any type of a fixed or removable random access memory (RAM), a read-only memory (ROM), a flash memory, a hard disk or other circuits or chips with similar functions or a combination of these devices, circuits and chips.

In the embodiment, the sound collecting device 110 may be a microphone. The definition module 120 may be configured to convert a standard instruction or a relay control code into an original control code. The allocation module 130 may be configured to determine the activated player 140 and may be configured to transmit the original control code to the specific player 140. In the embodiment, the player 140 may be a streaming player or a non-streaming player. The streaming player may be, for example, Netflix, Disney+, Spotify, Apple music, YouTube, KKBox or Apple TV, but the disclosure is not limited thereto. The non-streaming player may be, for example, an MP3 player or a media player, but the disclosure is not limited thereto. The projection device 100 may include one or a plurality of players 140 and is not limited to that shown in FIG. 1.

In an embodiment, the sound collecting device 110 may be, for example, a Bluetooth remote controller with a wireless microphone. For example, when a user presses a voice button on the remote controller, a conversation mode may be entered to activate the wireless microphone, and the Bluetooth remote control may transmit received voice signals to the projection device 100. This embodiment may be applied to the following implementation aspects where the projection device 100 communicates with a natural language model.

In an embodiment, the sound collecting device 110 may be, for example, a matrix sound collecting device. The matrix sound collecting device (microphone) is built in the projection device 100. For example, the user may speak directly to the projection device 100, and initiate a conversation by entering a conversation party when the projection device 100 receives a keyword (such as "projector"), and if the projection device 100 is playing audio and video at this moment, a volume will be reduced (or turned off). This embodiment may be applied to the following implementation aspects where the projection device 100 communicates with the natural language model.

In an embodiment, the sound collecting device 110 may be, for example, a built-in microphone of a mobile phone. For example, the mobile phone may activate an application corresponding to the projection device 100 to connect to the projection device 100 through Bluetooth/WiFi. When the application of the mobile phone is activated (or the application may also be activated through voice), the mobile phone may be automatically connected to the projection device 100 and enter the conversation mode. Then, a built-in microphone recording function of the mobile phone is turned on to receive the original instruction. The embodiment may be applied to the following implementation aspects where a terminal device communicates with the natural language model.

In an embodiment, the sound collecting device 110 may be, for example, a built-in microphone of a mobile phone, and the mobile phone may simply serve as the sound collecting device. For example, the mobile phone may be connected to the projection device 100 via Bluetooth/WiFi, but the mobile phone is not used as a medium to communicate with the natural language model, but is only used as a sound collecting device. The mobile phone only transmits an original instruction of a voice to the projection device 100, and communicates with a speech-to-text module and/or the natural language model through a cloud communication module of the projection device 100. The embodiment may be applied to the following implementation aspects where the projection device 100 communicates with the natural language model.

Figure 2:
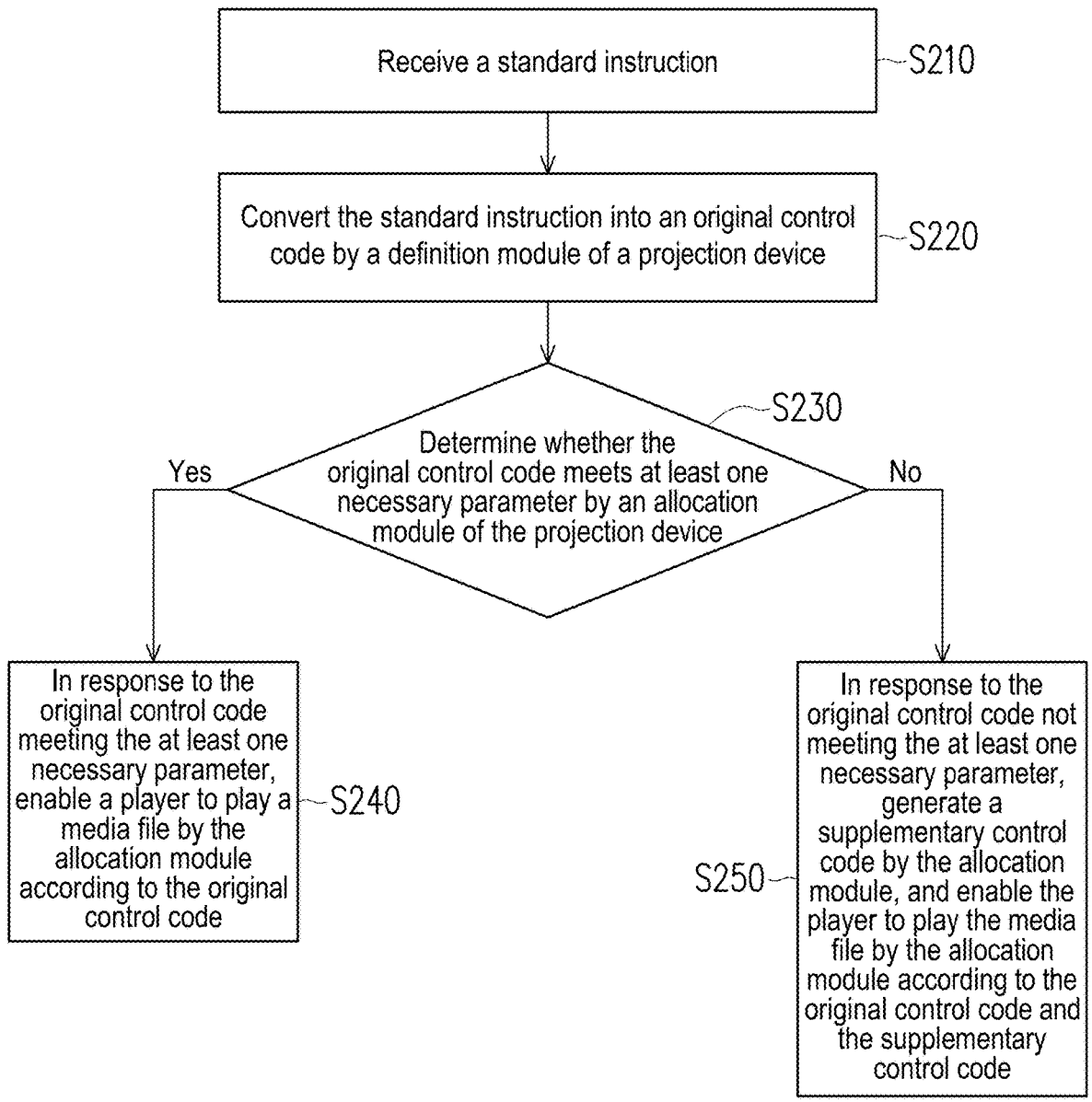
FIG. 2 is a flowchart of a control method of a projection device according to an embodiment of the disclosure.

FIG. 2 is a flowchart of a control method of a projection device according to an embodiment of the disclosure. Referring to FIG. 1 and FIG. 2, the projection device 100 may perform following steps S210 to S250. In the embodiment, the sound collecting device 110 may receive the original instruction corresponding to the original control code. In an embodiment, the original instruction may be a text instruction converted from the voice instruction, or a text instruction input by the user through an input device (such as a keyboard, a touch screen, etc.), which means there is no need to use the sound collecting device 110 in this embodiment, and the text instruction may be transmitted to the natural language model. The natural language model may read the original instruction of a text or a speech, convert or summarize the original instruction into a corresponding standard instruction, and provide the standard instruction to the definition module 120.

In the embodiment, the natural language model may be, for example, a chatbot, the chatbot has a machine learning algorithm, and the ChatBot may be, for example, any pre-trained chatbot such as the chat generative pre-trained transformer (ChatGPT), the Microsoft Bing, the Google Bard or the ERNIE Bot, etc., or may be a dedicated chatbot trained with data of a specific field. The natural language model may be used to perform natural language processing and understanding, dialogue management, speech-to-text, text-to-speech, etc. The natural language model may recognize multiple languages and accents. In the embodiment, the natural language model may be set up in a cloud server. The cloud server may include a processor and a storage device. The storage device is, for example, used to store a chatbot with a machine learning algorithm. The processor is, for example, configured to execute the above algorithm.

In step S210, the definition module 120 may receive the standard instruction. In step S220, the definition module 120 of the projection device 100 may convert the standard instruction into an original control code. In the embodiment, the original control code is converted from the standard instruction and may be used to control the projection device 100. The projection device 100 of different models may use different original control codes when performing the same operation. In step S230, the allocation module 130 of the projection device 100 may determine whether the original control code meets at least one necessary parameter. The at least one necessary parameter may, for example, include related parameters such as a player-specific parameter, a file-specific parameter, etc. If yes, in step S240, in response to the original control code meeting the at least one necessary parameter, the allocation module 130 may enable the player 140 to play a media file according to the original control code. A number of the media file may be one or plural. The media file may include text, pictures, photos, sounds (including music, voice narration, special sound effects), media information of animation or video. If not, in step S250, in response to the original control code not meeting the at least one necessary parameter, the allocation module 130 may generate a supplementary control code, and the allocation module 130 may enable the player 140 to play the media file according to the original control code and the supplementary control code. Therefore, according to the control method of the embodiment, the projection device 100 may effectively and automatically execute the player 140 to play the media file according to the instruction input by the user.

Figure 3:
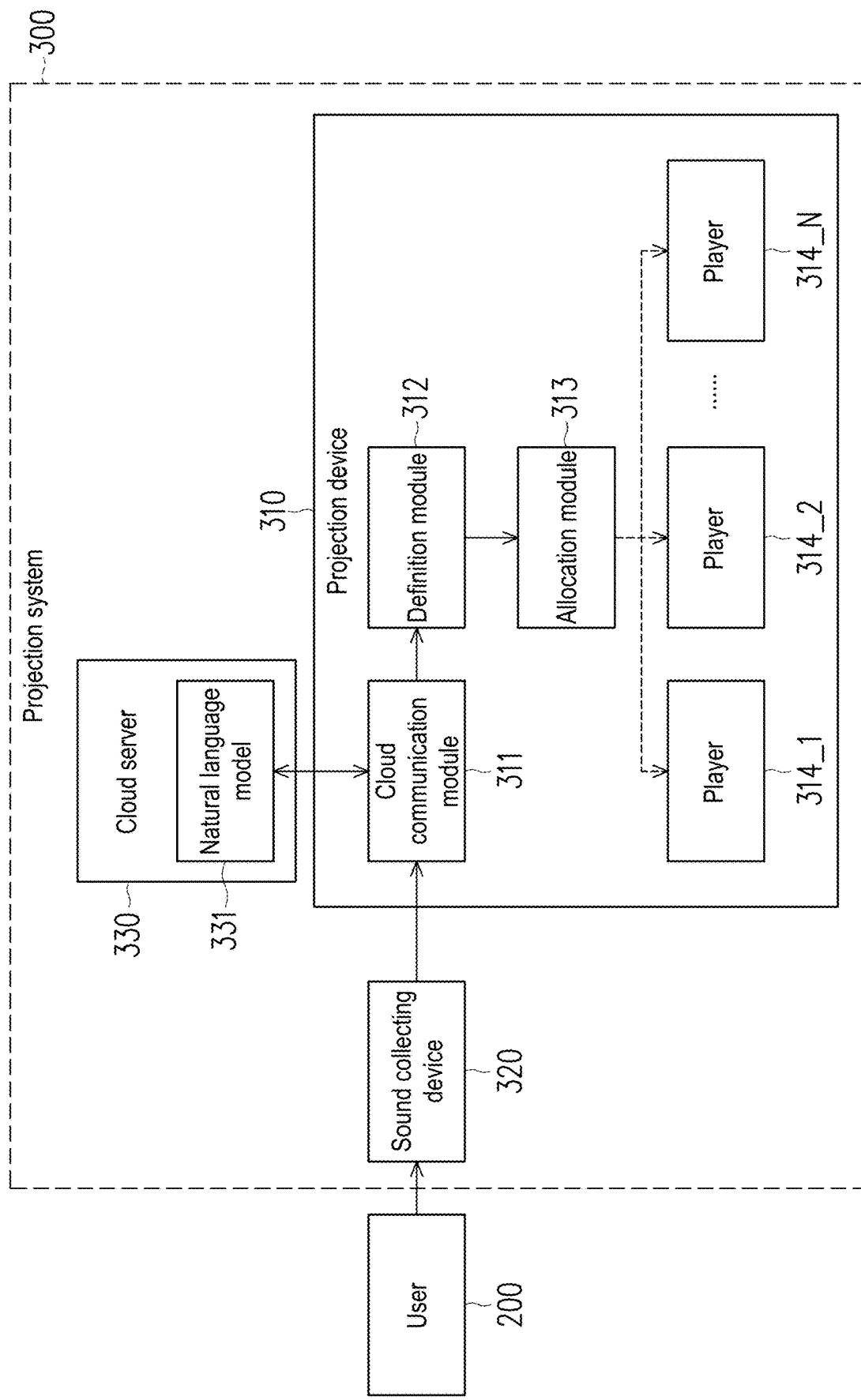
FIG. 3 is a schematic diagram of a projection system according to an embodiment of the disclosure.

FIG. 3 is a schematic diagram of a projection system according to an embodiment of the disclosure. Referring to FIG. 3, the projection system 300 includes a projection device 310, a sound collecting device 320 and a cloud server 330. The projection device 310 includes a cloud communication module 311, a definition module 312, an allocation module 313 and players 314_1-314_N, where N is a positive integer. A storage device of the projection device 310 may store programs or plug-ins of the cloud communication module 311, the definition module 312, the allocation module 313, and the players 314_1-314_N, which may be executed by a processor of the projection device 310. The cloud communication module 311 is coupled the sound collecting device 320, the cloud server 330 and the definition module 312. The allocation module 313 is coupled to the definition module 312 and the players 314_1-314_N. The cloud server 330 includes a natural language model 331. In an embodiment, the natural language model 331 may also be built in another cloud server, and the cloud server 330 is coupled with the natural language model 331. In the embodiment, the cloud communication module 311 is configured to communicate with the natural language model 331 of the cloud server 330.

In the embodiment, the sound collecting device 320 may receive a voice instruction in a natural language form from the user 200, and provide the voice instruction as an original instruction to the cloud communication module 311. The cloud communication module 311 may send the original instruction together with a rule instruction to the natural language model 331 of the cloud server 330. In an embodiment, the cloud communication module 311 may also be connected to another cloud server, and the other cloud server has a speech-to-text model to convert the original instruction in a voice data form into the original instruction in a text data form, and transmit the original instruction in the text data form back to the cloud communication module 311. In the embodiment, the rule instruction may be stored in the cloud communication module 311 or in the cloud server 330.

In the embodiment, after the natural language model 331 receives the original instruction and the rule instruction from the cloud communication module 311 of the projection device 310, the natural language model 331 may identify an intention of the original instruction, and convert the original instruction into the standard instruction according to a restriction of the rule instruction. The natural language model 331 returns the standard instruction to the cloud communication module 311 of the projection device 310. The definition module 312 of the projection device 310 may convert the standard instruction into the original control code to control the projection device 310 to perform operations.

The rule instruction is, for example, pre-configured to limit the natural language model 331 to ultimately output only instructions that the projection device 310 may (clearly) identify, so as to solve a problem of the projection device 310 being unable to identify a natural language. The rule instruction may also be configured to limit feedback content made by the natural language model 331 to hardware or software of the projection device 310 owned (or used) by the user 200, or to limit an authority of the user 200 to control the projection device 310. For example, in terms of hardware restriction, in the case that the projection device 310 only has a first high definition multimedia interface (HDMI) and a second HDMI, the rule instruction may limit that when the projection device 310 receives an original instruction of a third HDMI or above or other types of interfaces, the natural language model 331 may reply a prompt instruction, and the projection device 310 may generate prompt information, such as by projecting a prompt image or sending an audio to notify the user 200 that the instruction cannot be executed.

Figure 4:
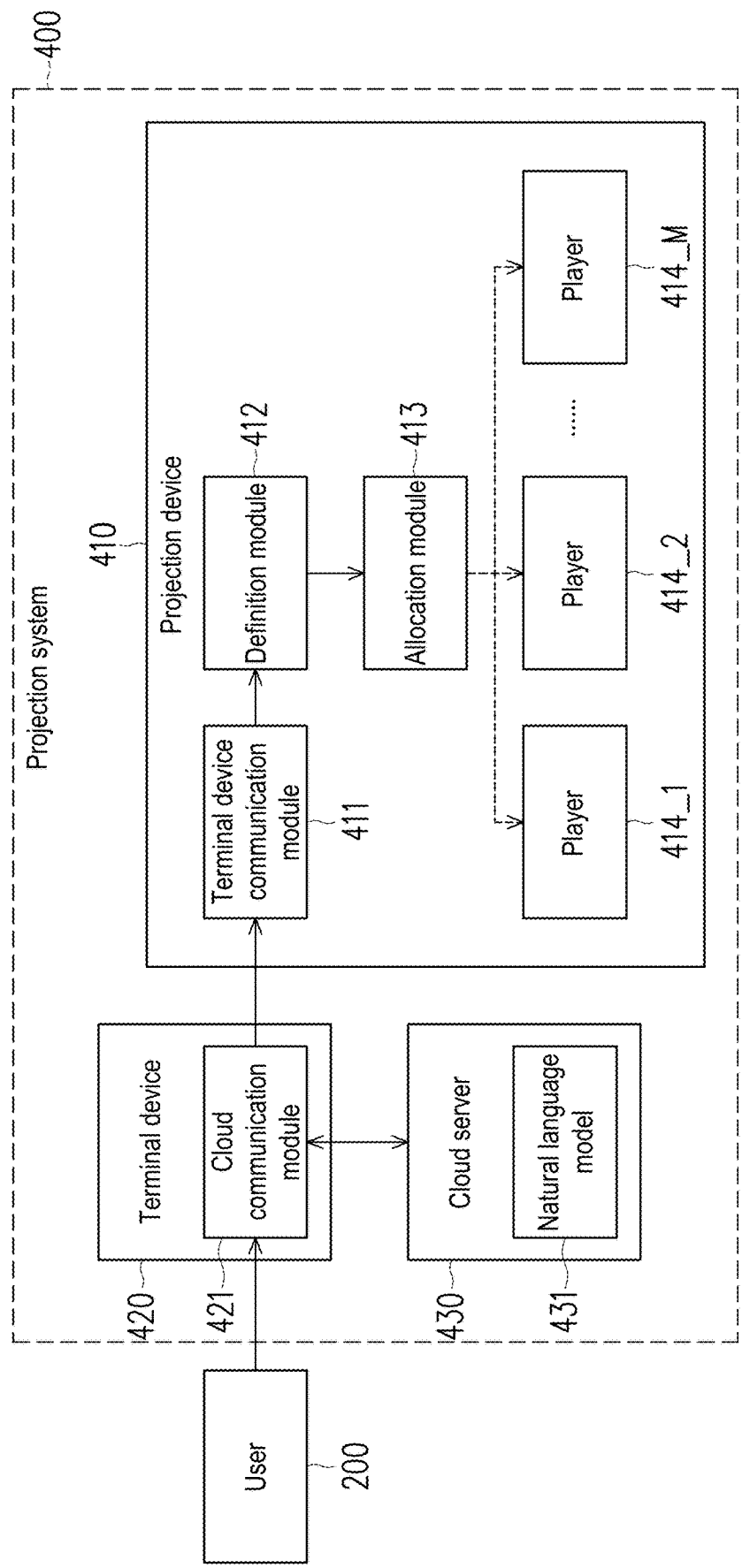
FIG. 4 is a schematic diagram of a projection system according to an embodiment of the disclosure.

FIG. 4 is a schematic diagram of a projection system according to an embodiment of the disclosure. Relevant technical features and advantages of a projection system 400 of FIG. 4 are similar to that of the projection system 300 of FIG. 3. The following embodiments use part of the contents of the foregoing embodiments, and the description of the same technical contents is omitted. For descriptions of omitted parts, reference may be made to the foregoing embodiments and will not be repeated in the following embodiments, and only differences there between are described below. Referring to FIG. 4, the projection system 400 includes a projection device 410, a terminal device 420 and a cloud server 430. The projection device 410 includes a terminal device communication module 411, a definition module 412, an allocation module 413, and players 414_1-414_M, where M is a positive integer. A storage device of the projection device 410 may store programs or plug-ins of the terminal device communication module 411, the definition module 412, the allocation module 413, and the players 414_1-414_M, which may be executed by a processor of the projection device 410. The terminal device communication module 411 is coupled the terminal device 420 and the definition module 412. The allocation module 413 is coupled to the definition module 412 and the players 414_1-414_M. The terminal device communication module 411 is configured to communicate with the terminal device 420. The terminal device 420 includes a cloud communication module 421. A storage device of the terminal device 420 may store programs or plug-ins of the cloud communication module 421, which may be executed by a processor of the terminal device 420. The cloud server 430 may include a natural language model 431. The cloud communication module 421 is configured to communicate with the natural language model 431 of the cloud server 430.

In the embodiment, the terminal device 420 may be, for example, an electronic device with a sound collecting device such as a smartphone or a computer. The terminal device 420 may receive a voice instruction from the user 200 and use the voice instruction as an original instruction. The cloud communication module 421 of the terminal device 420 may send the original instruction together with a rule instruction to the natural language model 431 of the cloud server 430. In an embodiment, the cloud communication module 421 may also be connected to another cloud server, and the other cloud server has a speech-to-text model to convert the original instruction in the voice data form into the original instruction in the text data form, and transmit the original instruction in the text data form back to the cloud communication module 421. In the embodiment, the rule instruction may be stored in the cloud communication module 421 or in the cloud server 430.

In another embodiment, the terminal device 420 may convert the standard instruction into a relay control code and transmit the relay control code to the terminal device communication module 411 of the projection device 410. The terminal device communication module 411 may further provide the relay control code to the definition module 412, and the definition module 412 converts the relay control code into the standard instruction.

In the embodiments of FIG. 3 and FIG. 4, if the content of the original instruction is sufficiently complete, for example, the content of the original instruction includes that the user 200 wants to use a specific player to play a specific media file (such as a video or music). For example, the original instruction may be "use Netflix to play movie A", and the natural language model 331 or 431 may output the complete standard instruction according to the original instruction and the rule instruction. The standard instruction may be converted into the original control code by the definition module 312 or 412 and transmitted to the allocation module 313 or 413. The allocation module 313 or 413 may send the original control code to a specific player (i.e., "Netflix") based on the content of the original control code, and enable the specific player to play a specific media file (i.e., "movie A").

If the content of the original instruction is not sufficiently complete, for example, the content of the original instruction only includes the user 200's request to play a specific media file, but does not specify which player to use. For example, the original instruction is "I want to watch movie A". In this case, the natural language model 331 or 431 may still output the standard instruction, and the projection device 310 or 410 may convert the standard instruction into the original control code, but the original control code is incomplete. In this regard, the allocation module 313 or 413 may be configured to determine whether the received original control code meets a necessary parameter. If the necessary parameter is missing, the allocation module 313 or 413 may provide the missing necessary parameter as a supplementary control code according to a status required to supplement the necessary parameter, and execute the original control code and the supplementary control code together. In other words, even when the original instruction provided by the user 200 is incomplete, the projection device 310 or 410 may successfully perform operations.

The above-mentioned necessary parameter may, for example, include at least a file-specific parameter and a player-specific parameter. The file-specific parameter is, for example, a name, a serial number, sorting, a playlist, a date, a type (such as a video, a music, a picture) of the media file, or a combination of the above. The player-specific parameter includes, for example, a player name. In an embodiment, the necessary parameter may also include a source of the media file or other parameters (such as a playback time, a duration or an available display subtitle of the media file), etc.

In an embodiment, the at least one necessary parameter may include a player-specific parameter. The player-specific parameter is configured to specify a specific player. In response to the original control code meeting the at least one necessary parameter, the allocation module 313 or 413 enables a specific player among the plurality of players to play one of the media file(s) (the specific media file) according to the original control code. In response to the original control code not meeting the at least one necessary parameter, the allocation module 313 or 413 generates a supplementary control code having the missing necessary parameter according to the missing necessary parameter, and the allocation module 313 or 413 generates a supplementary control code according to the original control code according to the missing necessary parameter. The allocation module 313 or 413 enables the specific player among the players to play one of the media file(s) (the specific media file) according to at least one of the original control code and the supplementary control code. When the missing necessary parameter specify is the player-specific parameter, the allocation module 313 or 413 selects the specific player from the players for playback according to the supplementary control code.

Figure 5:
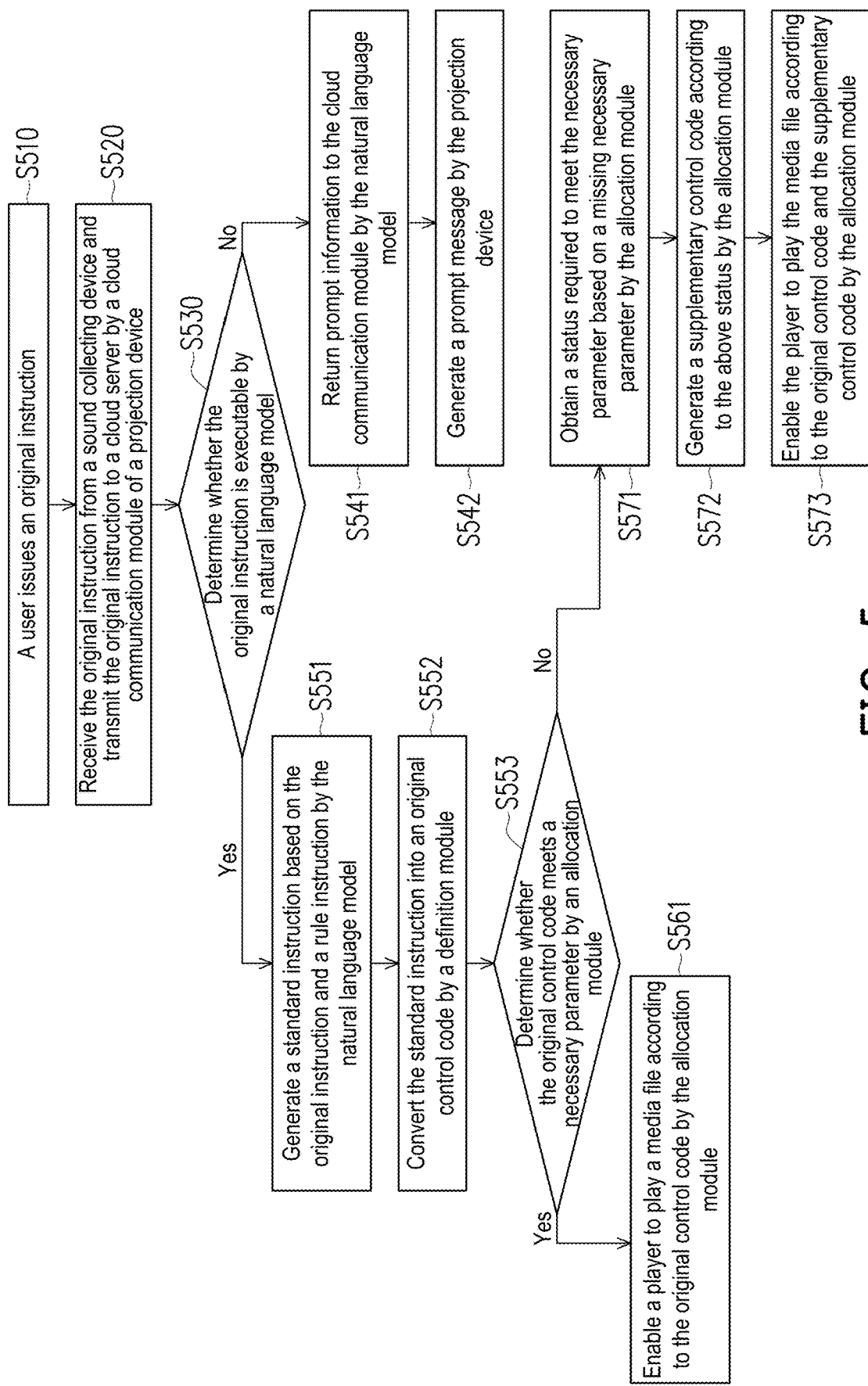
FIG. 5 is a flowchart of a control method of a projection device according to an embodiment of the disclosure.

FIG. 5 is a flowchart of a control method of a projection device according to an embodiment of the disclosure. Referring to FIG. 3 and FIG. 5, the projection system 300 of FIG. 3 may perform following steps S510 to S573 to achieve a function of voice controlling the projection device 310 to play a specific media file with a specific player. In step S510, the user 200 issues an original instruction. In step S520, the cloud communication module 311 of the projection device 310 receives the original instruction from the sound collecting device 320 and transmits the original instruction to the cloud server 330. In step S530, the natural language model 331 determines whether the original instruction is executable. If the original instruction cannot be executed, in step S541, the natural language model 331 returns prompt information to the cloud communication module 311. In step S542, the projection device 310 generates a prompt message according to the prompt information, where the prompt message may be presented, for example, through image projection and/or by playing a voice through a speaker. If the original instruction may be executed, in step S551, the natural language model 331 generates a standard instruction based on the original instruction and the rule instruction.

The natural language model 331 returns the standard instruction to the cloud communication module 311. The cloud communication module 311 provides the standard instruction to the definition module 312. In step S552, the definition module 312 converts the standard instruction into the original control code. In step S553, the allocation module 313 determines whether the original control code meets the necessary parameter. If the original control code meets the necessary parameter, in step S561, the allocation module 313 selects a player of the at least one player 314_1-314_N corresponding to the original control code according to the original control code to play a media file of at least one media file corresponding to the original control code. If the original control code does not meet the necessary parameter, in step S571, the allocation module 313 obtains a status required to meet the necessary parameter based on the missing necessary parameter. In step S572, the allocation module 313 generates a supplementary control code according to the above status. In step S573, the allocation module 313 selects the player of the at least one player 314_1-314_N corresponding to the original control code or the supplementary control code to play the media file of the at least one media file corresponding to the original control code or the supplementary control code according to at least one of the original control code and the supplementary control code.

Figure 6:
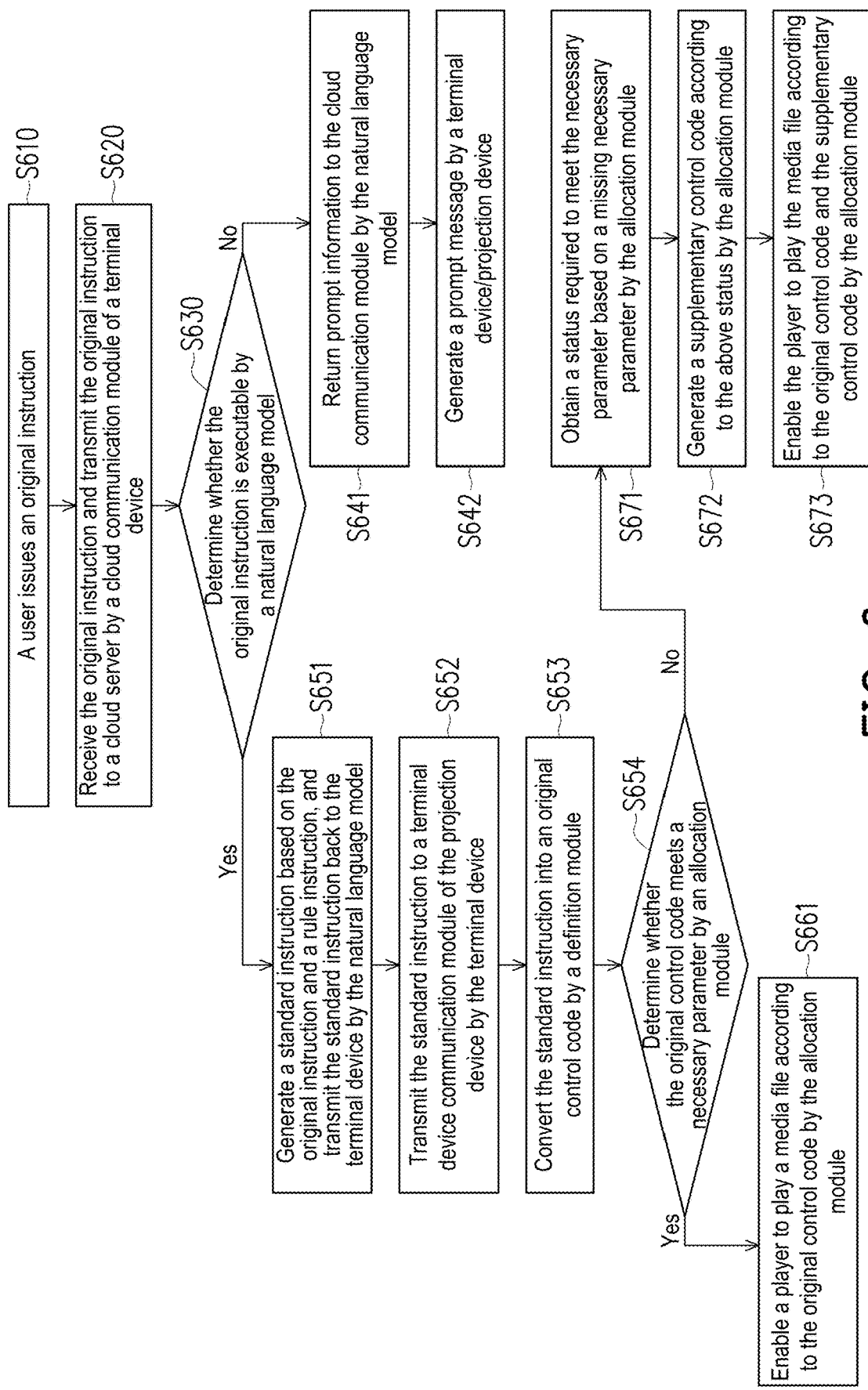
FIG. 6 is a flowchart of a control method of a projection device according to an embodiment of the disclosure.

FIG. 6 is a flowchart of a control method of a projection device according to an embodiment of the disclosure. Referring to FIG. 4 and FIG. 6, the projection system 400 of FIG. 4 may perform following steps S610 to S673 to achieve the function of voice controlling the projection device 410 to play a specific media file with a specific player. In step S610, the user 200 issues an original instruction. In step S620, the cloud communication module 421 of the terminal device 420 receives the original instruction and transmits the original instruction to the cloud server 430. In step S630, the natural language model 431 determines whether the original instruction is executable. If the original instruction cannot be executed, in step S641, the natural language model 431 returns prompt information to the cloud communication module 421. In step S642, the terminal device 420 generates a prompt message according to the prompt information, where the prompt message is, for example, presented in the form of image, text or audio. In an embodiment, the terminal device 420 provides the prompt information to the terminal device communication module 411 of the projection device 410. The projection device 410 generates the prompt message according to the prompt information. If the original instruction may be executed, in step S651, the natural language model 431 generates a standard instruction based on the original instruction and the rule instruction, and transmits the standard instruction back to the terminal device 420. In step S652, the terminal device 420 transmits the standard instruction to the terminal device communication module 411 of the projection device 410. In step S653, the definition module 412 converts the standard instruction into an original control code.

In step S654, the allocation module 413 determines whether the original control code meets the necessary parameter. If the original control code meets the necessary parameter, in step S661, the allocation module 413 selects a player of the at least one player 414_1-414_M corresponding to the original control code to play a media file of the at least one media file corresponding to the original control code according to the original control code. If the original control code does not meet the necessary parameter, in step S671, the allocation module 413 obtains a status required to meet the necessary parameter based on the missing necessary parameter. In step S672, the allocation module 413 generates a supplementary control code according to the above status. In step S673, the allocation module 413 selects the player of the at least one player 414_1-414_M corresponding to the original control code or the supplementary control code to play the media file of the at least one media file corresponding to the original control code or the supplementary control code according to at least one of the original control code and the supplementary control code.

Figure 7:
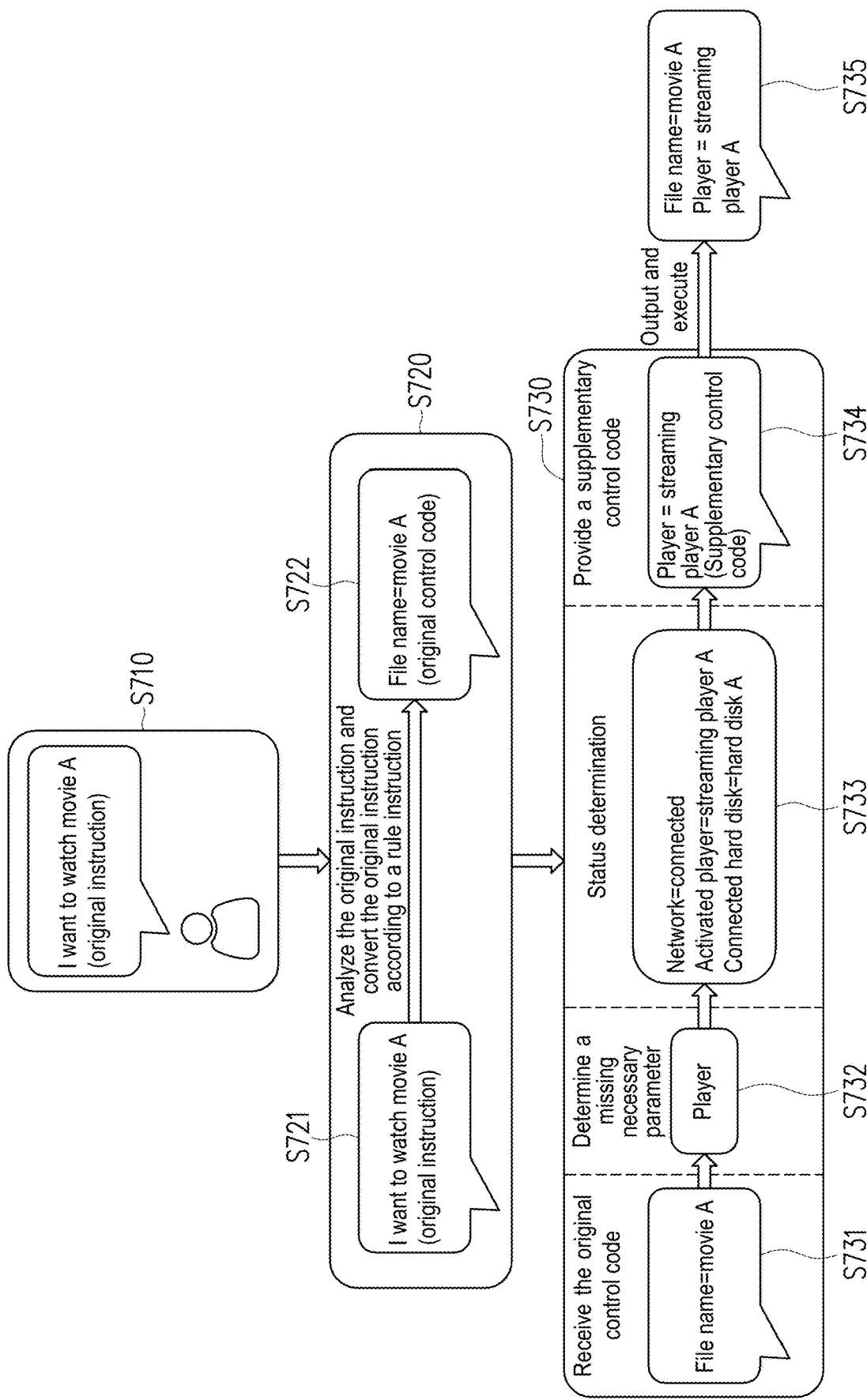
FIG. 7 to FIG. 12 are operational schematic diagrams of a plurality of exemplary embodiments of the disclosure.

FIG. 7 to FIG. 12 are operational schematic diagrams of a plurality of exemplary embodiments of the disclosure. With reference to FIG. 3, FIG. 4 and FIG. 7 to FIG. 12, operation methods of the allocation module 313 in the embodiment of FIG. 3 and the allocation module 413 in the embodiment of FIG. 4 are described in detail below. As shown in FIG. 7, in step S710, the user 200 may provide an original instruction, such as "I want to watch movie A". In step S720, the natural language model 331 and the definition module 312 may analyze the original instruction and convert the original instruction into an original control code according to the rule instruction. In step S721, the natural language model 331 may analyze the original instruction "I want to watch movie A" and generate a corresponding standard instruction. In step S722, the definition module 312 may convert the corresponding standard instruction into the corresponding original control code, which for example instructs to play a media file with a file name of "movie A".

In step S730, the allocation module 313 may further analyze the original control code. When the original control code includes the file-specific parameter but does not include the player-specific parameter, the allocation module 313 may generate a supplementary control code for specifying a player so that the allocation module 313 selects the player with the highest priority from the at least one player 314_1-314_N, where the player with the highest priority (the specific player) is, for example, the currently activated player. In this way, the player with the highest priority (the specific player) may play the media file according to the file-specific parameter in the original control code.

The allocation module 313 may further determine a network connection status of the projection device 310, determine whether there is an activated player, and/or determine whether the projection device 310 has a connected hard disk. The hard disk may be, for example, an external hard disk connected through a connection port, or a network hard disk connected through a network, and the media files in the hard disk may be read by a non-streaming player. When the allocation module 313 determines that there is the activated player and the activated player is a streaming player, and the projection device 310 is in a network connected status, the streaming player may be the player with the highest priority. Alternatively, when the allocation module 313 determines that there is the activated player and the activated player is a non-streaming player, and the projection device 310 is connected to at least one hard disk, the non-streaming player is the player with the highest priority. Alternatively, when the allocation module 313 determines that there is the activated player and the activated player is the streaming player, and the projection device 310 is in a non-network connected status, the allocation module 313 switches the activated player to the non-streaming player with the highest priority. The player with the highest priority may be a first available player in a preset player ranking. The player ranking may be, for example, a streaming player A, a streaming player B and a non-streaming player C in a descending order of priority. In the embodiment, the non-streaming player with the highest priority is the non-streaming player C.

For example, as shown in FIG. 7, in step S731, the allocation module 313 may receive the original control code (i.e., file-specific parameter) instructing to play the media file with the file name of "movie A". In step S732, the allocation module 313 may determine that the necessary parameter missing in the original control code is a name of the player (i.e., the player-specific parameter is missing). In step S733, the allocation module 313 may perform status determination to determine that the projection device 310 is in the network connected status, the activated player is the streaming player A, and the connected hard disk is a hard disk A. Therefore, in step S734, the supplementary control code provided by the allocation module 313 is a player-specific supplementary parameter, which is, for example, the supplementary control code used to instruct the player to be the streaming player A. Finally, in step S735, the allocation module 313 may select a corresponding one of the players 314_1-314_N (i.e., the "streaming player A") to play the corresponding media file (i.e., the "movie A") according to the original control code instructing to play the media file with the file name of "movie A" and the supplementary control code instructing the player to be the streaming player A.

Figure 8:
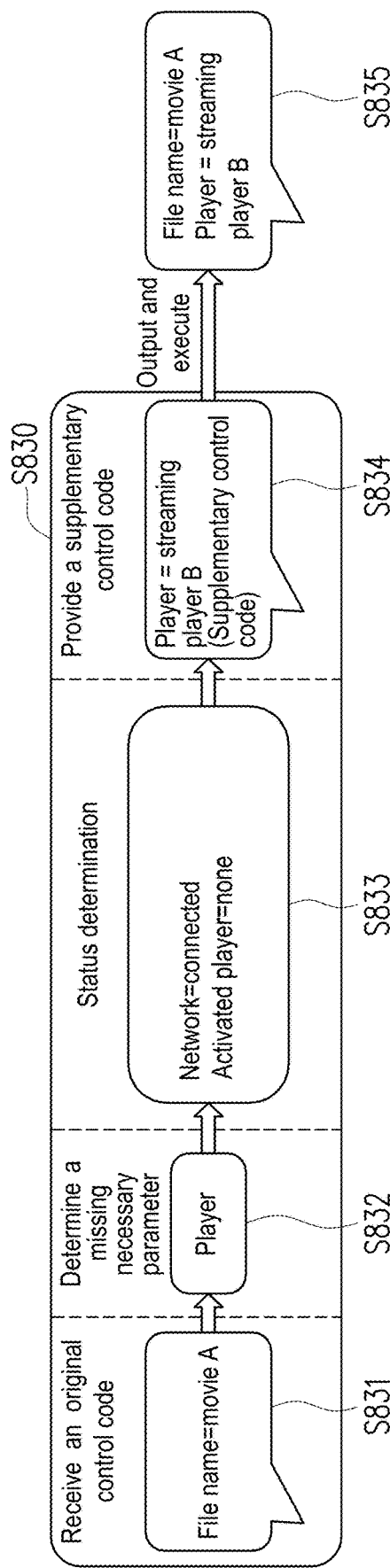

Referring to FIG. 8, in another embodiment, when the allocation module 313 determines that there is no activated player in the projection device 310, and the projection device 310 is in the network connected status, the player with the highest priority is taken as the selected player, for example, the streaming player B.

For example, as shown in FIG. 8, in step S830, the allocation module 313 may analyze the original control code. In step S831, the allocation module 313 may receive the original control code (i.e., file-specific parameter) instructing to play the media file with the file name of "movie A". In step S832, the necessary parameter that the allocation module 313 lacks in the original control code is the name of the player (i.e., the player-specific parameter is missing). In step S833, the allocation module 313 may perform status determination to determine that the projection device 310 is in the network connected status and the activated player is the streaming player B. Therefore, in step S834, the supplementary control code provided by the allocation module 313 is the player-specific supplementary parameter, i.e., the supplementary control code instructing the player to be the streaming player B. Finally, in step S835, the allocation module 313 may select a corresponding one of the players 314_1-314_N (i.e., the "streaming player B") to play the corresponding media file (i.e., the "movie A") according to the original control code instructing to play the media file with the file name of "movie A" and the supplementary control code instructing the player to be the streaming player B.

Figure 9:
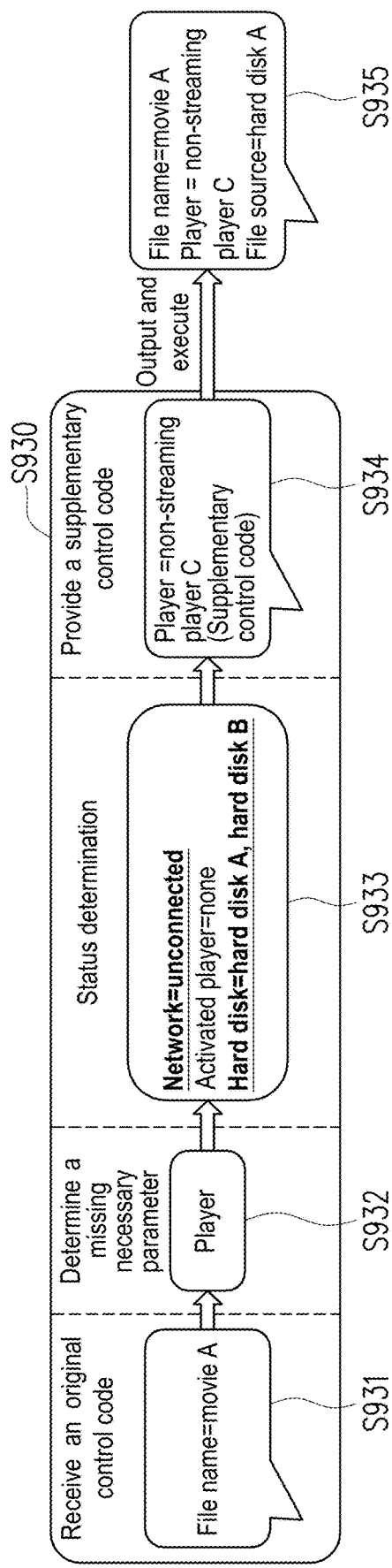

Referring to FIG. 9, in another embodiment, when the allocation module 313 determines that the projection device 310 is in the non-network connected status and there is no activated player, the player with the highest priority selected by the allocation module 313 is a non-streaming player. In this regard, the preset player ranking may be, for example, the streaming player A, the streaming player B, the non-streaming player C, and a non-streaming player D in a descending order of priority. Since the network connection status is the non-network connected status, the allocation module 313 selects to use the non-streaming player C with the highest priority.

When the projection device 310 is connected to a hard disk, the allocation module 313 executes the non-streaming player, and the non-streaming player plays the media file according to the file-specific parameter by reading the hard disk. Alternatively, when the projection device 310 is connected to a plurality of hard disks, the allocation module 313 executes the non-streaming player, and the non-streaming player plays the media file according to the file-specific parameter by reading the hard disk with the highest priority from the hard disks. The hard disk with the highest priority may be a first ranked hard disk in the preset hard disk ranking. The hard disk ranking may be, for example, sequentially a first hard disk corresponding to "hard disk A" and a second hard disk corresponding to "hard disk B" in a descending order of priority.

For example, as shown in FIG. 9, in step S930, the allocation module 313 may analyze the original control code. In step S931, the allocation module 313 may receive the original control code (i.e., the file-specific parameter) instructing to play the media file with the file name of "movie A". In step S932, the necessary parameter that the allocation module 313 lacks in the original control code is the name of the player (i.e., the player-specific parameter is missing). In step S933, the allocation module 313 may perform status determination to determine that the projection device 310 is in the non-network connected status, there is no activated player, and the connected hard disks are "hard disk A" and "hard disk B". Therefore, in step S934, the supplementary control code that may be provided by the allocation module 313 is the player-specific supplementary parameter and a hard disk-specific supplementary parameter, i.e., the supplementary control code indicating that the player uses the non-streaming player C and a file source is the hard disk A. Finally, in step S935, the allocation module 313 may select a corresponding one of the players 314_1-314_N (i.e., the "non-streaming player C") to read a corresponding one of the plurality of hard disks (i.e., the "hard disk A") to play the corresponding media file (i.e. the "movie A") according to the original control code instructing to play the media file with the file name of "movie A", the supplementary control code instructing the player to be the non-streaming player C, and instructing that the file source is the hard disk A.

When the allocation module 313 determines that there is the activated player and the activated player is a streaming player, but the projection device 310 is in the non-network connected status, the allocation module 313 switches the activated player to the non-streaming player with the highest priority.

Figure 10:
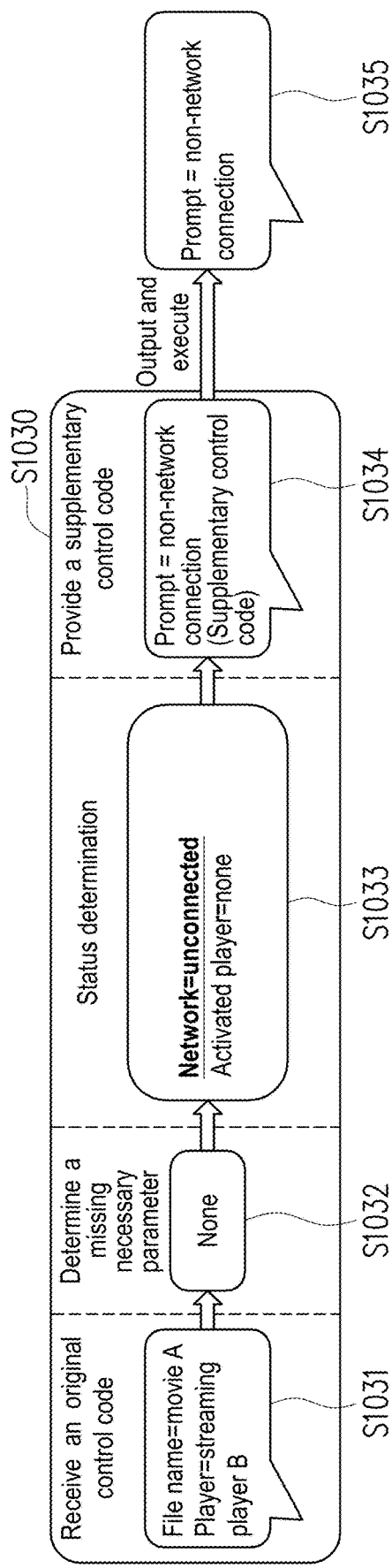

Referring to FIG. 10, in another embodiment, when the allocation module 313 determines that the original control code includes the file-specific parameter and the player-specific parameter, the allocation module 313 determines that the player-specific parameter is used to specify the use of a streaming player, and when the projection device 310 is in the non-network connected status, the projection device 310 may, for example, generate a prompt message. Alternatively, when the allocation module 313 determines that the player-specific parameter is used to specify a non-streaming player and the projection device 310 is not connected to a hard disk, the projection device 310 may, for example, generate the prompt message to inform the user 200 that the original instruction cannot be achieved.

For example, as shown in FIG. 10, in step S1030, the allocation module 313 may analyze the original control code. In step S1031, the allocation module 313 may receive an original control code instructing to play a media file with the file name of "movie A" and instructing the player to be the "streaming player B", i.e., the original control code includes the file-specific parameter and the player-specific parameter. In step S1032, the allocation module 313 may determine that the original control code is not lack of the necessary parameter. In step S1033, the allocation module 313 may perform status determination to determine that the projection device 310 is in the non-network connected status and there is no activated player. Therefore, in step S1034, the supplementary control code that may be provided by the allocation module 313 is used to generate a prompt message of non-network connection. Finally, in step S1035, the allocation module 313 may generate the prompt message of non-network connection according to the supplementary control code, so that the projection device 310 may generate the prompt message.

For another example, in another situation, when the allocation module 313 receives an original control code instructing to play a media file with the file name of "movie A" and instructing the player to be the "non-streaming player C", if multiple media files that meet the file-specific parameter are found in the non-streaming player C, i.e., multiple media files with the file name of the "movie A" are found, the allocation module 313 may display a list of videos that meet this condition on a display interface or a projection screen through the projection device 310 for the user to select, or the allocation module 313 may also generate a supplementary control code, and the supplementary control code may be preset to automatically play the aforementioned plurality of media files according to rankings such as a file order, play times, upload dates, etc.

Figure 11:
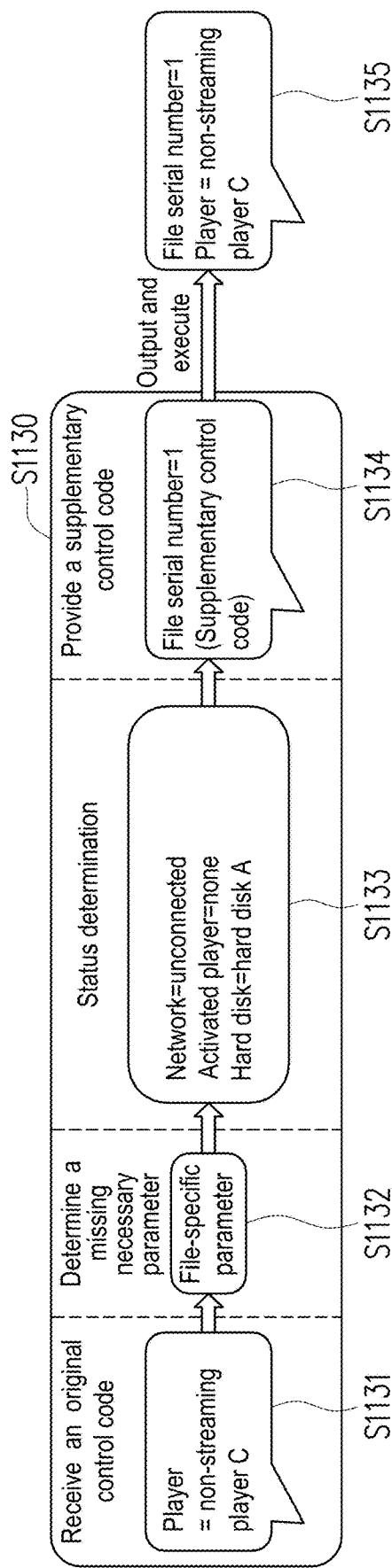

Referring to FIG. 11, in another embodiment, when the allocation module 313 determines that the original control code includes the player-specific parameter but does not include the file-specific parameter, the player-specific parameter is used to instruct the player to be a non-streaming player, the allocation module 313 determines that the projection device 310 is in the non-network connected status and the projection device 310 is connected to at least one hard disk, the allocation module 313 may generate a supplementary control code for specifying to play a media file, and the allocation module 313 selects the media file with the highest priority, where the media file with the highest priority may be a preset media file ranking. The media file ranking may be, for example, a media file serial number 1, a media file serial number 2, and a media file serial number 3 in a descending order of priority. Therefore, the allocation module 313 may execute the player according to the player-specific parameter and play the corresponding media file according to the supplementary control code. The media file ranking may be set in a setting interface (such as OSD) of the projection device 310, which may be, for example, set according to serial numbers of the file names of the plurality of media files, according to play times of the plurality of media files, or according to rating values of the plurality of media files, etc.

For example, as shown in FIG. 11, in step S1130, the allocation module 313 may analyze the original control code. In step S1131, the allocation module 313 may receive the original control code (i.e., the player-specific parameter) instructing the player to be the "non-streaming player C". In step S1132, the allocation module 313 may determine that the necessary parameter missing in the original control code is the file name (i.e., the file-specific parameter is missing). In step S1133, the allocation module 313 may perform status determination to determine that the projection device 310 is in the non-network connected status, there is no activated player, and the connected hard disk is the "hard disk A". Therefore, in step S1134, the allocation module 313 may provide the supplementary control code of the file-specific supplementary parameter, i.e., the supplementary control code used to indicate that the serial number of the played media file is 1. Finally, in step S1135, the allocation module 313 may select a corresponding one of the players 314_1-314_N (i.e., the "non-streaming player C") to read a corresponding one of the plurality of hard disks (i.e., the "hard disk A") according to the original control code instructing the player to be the non-streaming player C and reading the hard disk A, and the supplementary control code indicating that the media file serial number is 1, so as to play the media file with the media file serial number of 1.

Figure 12:
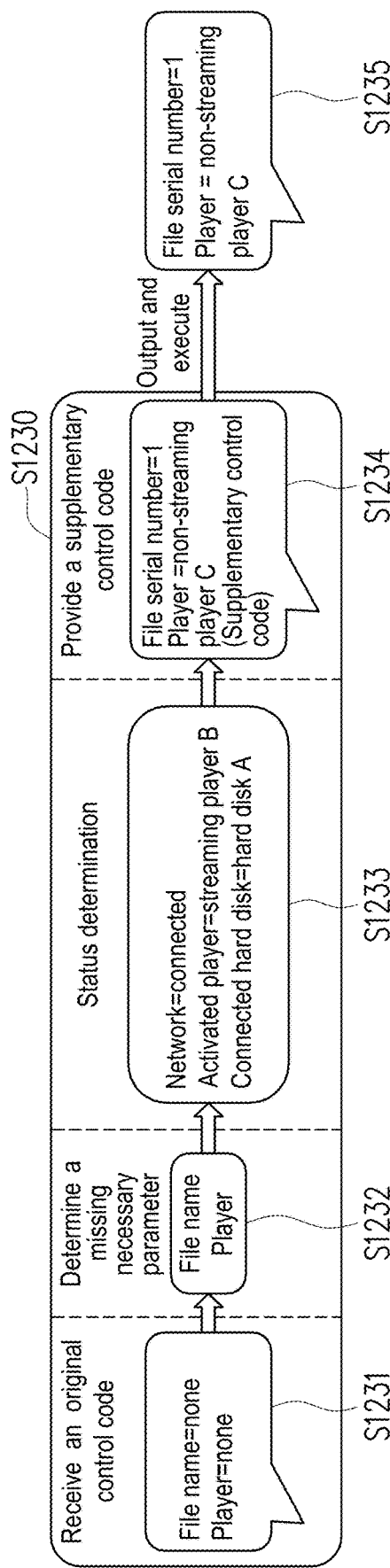

Referring to FIG. 12, in another embodiment, when the allocation module 313 determines that the original control code does not include the player-specific parameter and the file-specific parameter, the allocation module 313 may generate a supplementary control code, where the supplementary control code includes a play-specific supplementary parameter and a file-specific supplementary parameter. The player-specific supplementary parameter may be, for example, used to specify a non-streaming player, and the allocation module 313 may determine whether the projection device 310 is connected to a hard disk. When the projection device 310 is connected to the hard disk, the allocation module 313 executes the non-streaming player according to the player-specific supplementary parameter, and the non-streaming player reads the hard disk to play the media file according to the file-specific supplementary parameter. Comparatively, when the projection device 310 is not connected to the hard disk, the projection device 310 generates a prompt message, or the allocation module 313 may change to execute a streaming player according to the player-specific supplementary parameter.

Alternatively, the player-specific supplementary parameter may also be used to specify a streaming player, and the allocation module 313 may determine a network connection status of the projection device 310. When the network connection status is the network connected status, the allocation module 313 executes the streaming player according to the player-specific supplementary parameter, and the streaming player plays the media file according to the file-specific supplementary parameter. Comparatively, when the network connection status is the non-network connected status, the projection device 310 may generate a prompt message, or the allocation module 313 may change to execute a non-streaming player according to the player-specific supplementary parameter. It is assumed that both of the non-streaming player and the streaming player may all be executed, a priority of the allocation module 313 in selecting to use the non-streaming player may be higher than that of the streaming player.

For example, as shown in FIG. 12, if the original instruction is "play video as you like", in step S1230, the allocation module 313 may analyze the original control code. In step S1231, the allocation module 313 may receive the original control code that lacks both of the player-specific parameter and the file-specific parameter. In step S1232, the allocation module 313 may determine that the necessary parameters missing from the original control code are the file name and the player name (i.e., the player-specific parameter and the file-specific parameter are missing). In step S1233, the allocation module 313 may perform status determination to determine that the projection device 310 is in the network connected status, the activated player is the streaming player B, and the connected hard disk is the "hard disk A". Therefore, in step S1234, the supplementary control code that may be provided by the allocation module 313 includes the player-specific supplementary parameter and the file-specific supplementary parameter, i.e., including the supplementary control code instructing to execute the non-streaming player C and instructing the media file serial number of 1, and the supplementary control code may also include a hard disk-specific supplementary parameter used to indicate that a file source is the hard disk A. Finally, in step S1235, the allocation module 313 may select a corresponding one of the players 314_1-314_N (i.e., the "non-streaming player C") to read a corresponding one of the plurality of hard disks (i.e., the "hard disk A") according to the supplementary control code instructing the player to be the non-streaming player C, instructing the file source to be the hard disk A and instructing to play the media file serial number of 1, so as to play the media file with the media file serial number of 1.

In summary, according to the projection system, projection device and the control method thereof of the disclosure, the projection device may execute the corresponding player to play the corresponding media file according to the original instruction provided by the user. When the original instruction provided by the user lacks instruction content, the projection system, projection device and the control method thereof may also automatically generate an appropriate supplementary control code to effectively execute a specific player and play a specific media file.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control method of a projection device, comprising:
   receiving a standard instruction;
   converting the standard instruction into an original control code by a definition module of the projection device;
   determining whether the original control code meets at least one necessary parameter by an allocation module of the projection device;
   in response to the original control code meeting the at least one necessary parameter, enabling a player of at least one player to play a media file of at least one media file by the allocation module according to the original control code; and
   in response to the original control code not meeting the at least one necessary parameter, generating a supplementary control code by the allocation module, and enabling the player of the at least one player to play the media file of the at least one media file by the allocation module according to at least one of the original control code and the supplementary control code.

2. The control method of the projection device as claimed in claim 1, wherein the step of receiving the standard instruction comprises:
   receiving an original instruction from a sound collecting device by a cloud communication module;
   generating the standard instruction based on the original instruction and a rule instruction by a natural language model; and
   receiving the standard instruction from the natural language model by the cloud communication module.

3. The control method of the projection device as claimed in claim 1, wherein the step of receiving the standard instruction comprises:
   receiving an original instruction by a terminal device;
   generating the standard instruction based on the original instruction and a rule instruction by a natural language model;
   receiving the standard instruction from the natural language model by a cloud communication module of the terminal device; and
   receiving the standard instruction from the terminal device by a terminal device communication module of the projection device.

4. The control method of the projection device as claimed in claim 1, wherein the at least one necessary parameter comprises a file-specific parameter and a player-specific parameter.

5. The control method of the projection device as claimed in claim 4, wherein the step of in response to the original control code not meeting the at least one necessary parameter comprises:
   in response to the original control code comprising the file-specific parameter but not comprising the player-specific parameter, generating the supplementary control code for specifying a player by the allocation module, so that the allocation module selects the player with a highest priority from the at least one player; and
   playing the corresponding media file according to the file-specific parameter by the player with the highest priority.

6. The control method of the projection device as claimed in claim 5, wherein the step of selecting the player with the highest priority by the allocation module comprises:
  determining whether there is an activated player in the projection device by the allocation module;
  in response to the allocation module determining that there is the activated player and the activated player is a streaming player, and the projection device being in a network connected status, the streaming player being the player with the highest priority;
  in response to the allocation module determining that there is the activated player and the activated player is a non-streaming player, and the projection device being connected to at least one hard disk, the non-streaming player being the player with the highest priority; and
  in response to the allocation module determining that there is the activated player and the activated player is the streaming player, and the projection device being in a non-network connected status, switching the activated player to the non-streaming player with the highest priority by the allocation module.

7. The control method of the projection device as claimed in claim 5, wherein the step of selecting the player with the highest priority by the allocation module comprises:
  determining a network connection status of the projection device by the allocation module; and
  in response to the network connection status being the non-network connected status and the projection device being connected to at least one hard disk, selecting the player with the highest priority as a non-streaming player by the allocation module.

8. The control method of the projection device as claimed in claim 7, further comprising:
  in response to the projection device being connected to a hard disk of the at least one hard disk, enabling the non-streaming player to play the corresponding media file by reading the hard disk according to the file-specific parameter by the allocation module; and
  in response to the projection device being connected to a plurality hard disks of the at least one hard disk, enabling the non-streaming player to play the corresponding media file according to the file-specific parameter by reading a hard disk with a highest priority from the hard disks by the allocation module.

9. The control method of the projection device as claimed in claim 4, wherein the step of in response to the original control code not meeting the at least one necessary parameter comprises:
  in response to the original control code comprising the player-specific parameter but not comprising the file-specific parameter, generating the supplementary control code for specifying to play a media file by the allocation module, so that the allocation module selects the media file with a highest priority from the at least one media file; and
  executing the corresponding player according to the player-specific parameter by the allocation module, and playing the corresponding media file according to the supplementary control code.

10. The control method of the projection device as claimed in claim 4, wherein the step of in response to the original control code not meeting the at least one necessary parameter comprises:
  in response to the original control code not comprising the player-specific parameter and the file-specific parameter, generating the supplementary control code by the allocation module, wherein the supplementary control code comprises a player-specific supplementary parameter and a file-specific supplementary parameter;
  in response to the player-specific supplementary parameter being configured to specify a non-streaming player, determining whether the projection device is connected to a hard disk by the allocation module;
  in response to the projection device being connected to the hard disk, enabling the non-streaming player to play the corresponding media file by reading the hard disk based on the file-specific supplementary parameter by the allocation module according to the player-specific supplementary parameter; and
  in response to the projection device being not connected to the hard disk, generating a prompt message by the projection device.

11. The control method of the projection device as claimed in claim 10, wherein the step of in response to the original control code not meeting the at least one necessary parameter comprises:
  in response to the player-specific supplementary parameter being configured to specify a streaming player, determining a network connection status of the projection device by the allocation module;
  in response to the network connection status being a network connected status, enabling the streaming player to play the corresponding media file based on the file-specific supplementary parameter by the allocation module according to the player-specific supplementary parameter; and
  in response to the network connection status being a non-network connected status, generating the prompt message by the projection device.

12. The control method of the projection device as claimed in claim 4, further comprising:
  in response to the original control code comprising the player-specific parameter, the player-specific parameter being used to specify a streaming player, and the projection device being in a non-network connected status, generating a prompt message by the projection device; and
  in response to the original control code comprising the player-specific parameter, the player-specific parameter being used to specify a non-streaming player, and the projection device being not connected to a hard disk, generating the prompt message by the projection device.

13. A projection system, comprising:
  a cloud server; and
  a projection device, configured to receive a standard instruction generated by the cloud server, wherein the projection device comprises:
    at least one player;
    a definition module, configured to convert the standard instruction into an original control code; and
    an allocation module, coupled to the definition module, and configured to determine whether the original control code meets at least one necessary parameter,
  wherein in response to the original control code meeting the at least one necessary parameter, the allocation module is configured to enable a player of the at least one player to play a media file of at least one media file according to the original control code,
  wherein in response to the original control code not meeting the at least one necessary parameter, the allocation module is configured to generate a supplementary control code, and the allocation module enables the player of the at least one player to play the media file of the at least one media file according to at least one of the original control code and the supplementary control code.

14. The projection system as claimed in claim 13, further comprising:
a sound collecting device, coupled to the projection device,
wherein the projection device further comprises:
a cloud communication module, coupled to the definition module and the cloud server, and configured to receive an original instruction from the sound collecting device,
wherein a natural language model of the cloud server generates the standard instruction based on the original instruction and a rule instruction, and the cloud communication module receives the standard instruction from the cloud server.

15. The projection system as claimed in claim 13, further comprising:
a terminal device, coupled to the projection device, and configured to receive an original instruction, wherein the terminal device comprises:
a cloud communication module, coupled to the cloud server, wherein the cloud communication module obtains the standard instruction based on the original instruction and a rule instruction through a natural language model of the cloud server,
wherein the projection device further comprises:
a terminal device communication module, coupled to the allocation module and the terminal device, and configured to receive the standard instruction from the terminal device.

16. The projection system as claimed in claim 13, wherein the at least one necessary parameter comprises a file-specific parameter and a player-specific parameter.

17. The projection system as claimed in claim 16, wherein in response to the original control code not meeting the at least one necessary parameter:
in response to the original control code comprising the file-specific parameter but not comprising the player-specific parameter, the allocation module generates the supplementary control code for specifying a player, so that the allocation module selects the player with a highest priority from the at least one player, and the player with the highest priority plays the corresponding media file according to the file-specific parameter.

18. The projection system as claimed in claim 17, wherein in response to the allocation module selecting the player with the highest priority, the allocation module is further configured to determine whether there is an activated player in the projection device,
wherein in response to the allocation module determining that there is the activated player and the activated player is a streaming player, and the projection device being in a network connected status, the streaming player is the player with the highest priority,
wherein in response to the allocation module determining that there is the activated player and the activated player is a non-streaming player, and the projection device being connected to at least one hard disk, the non-streaming player is the player with the highest priority,
wherein in response to the allocation module determining that there is the activated player and the activated player is the streaming player, and the projection device being in a non-network connected status, the allocation module switches the activated player to the non-streaming player with the highest priority.

19. The projection system as claimed in claim 17, wherein in response to the allocation module selecting the player with the highest priority:
the allocation module determines a network connection status of the projection device,
wherein in response to the network connection status being the non-network connected status and the projection device being connected to at least one hard disk, the allocation module selects the player with the highest priority as a non-streaming player.

20. The projection system as claimed in claim 19, wherein in response to the projection device being connected to a hard disk of the at least one hard disk, the allocation module enables the non-streaming player to play the corresponding media file according to the file-specific parameter by reading the hard disk,
wherein in response to the projection device being connected to a plurality hard disks of the at least one hard disk, the allocation module is configured to enable the non-streaming player to play the corresponding media file according to the file-specific parameter by reading a hard disk with a highest priority from the hard disks.

21. The projection system as claimed in claim 16, wherein in response to the original control code not meeting the at least one necessary parameter:
in response to the original control code comprising the player-specific parameter but not comprising the file-specific parameter, the allocation module generates the supplementary control code for specifying to play a media file, so that the allocation module selects the media file with a highest priority from the at least one media file,
wherein the allocation module is configured to execute the corresponding player according to the player-specific parameter, and play the corresponding media file according to the supplementary control code.

22. The projection system as claimed in claim 16, wherein in response to the original control code not meeting the at least one necessary parameter:
in response to the original control code not comprising the player-specific parameter and the file-specific parameter, the allocation module is configured to generate the supplementary control code, wherein the supplementary control code comprises a player-specific supplementary parameter and a file-specific supplementary parameter;
in response to the player-specific supplementary parameter being configured to specify a non-streaming player, the allocation module is configured to determine whether the projection device is connected to a hard disk;
in response to the projection device being connected to the hard disk, the allocation module is configured to enable the non-streaming player to play the corresponding media file by reading the hard disk based on the file-specific supplementary parameter according to the player-specific supplementary parameter; and
in response to the projection device being not connected to the hard disk, the projection device generates a prompt message.

23. The projection system as claimed in claim 22, wherein in response to the original control code not meeting the at least one necessary parameter:
in response to the player-specific supplementary parameter being configured to specify a streaming player, the allocation module determines a network connection status of the projection device, in response to the network connection status being a network connected status, the allocation module enables the streaming player to play the media file based on the file-specific supplementary parameter according to the player-specific supplementary parameter, in response to the network connection status being a non-network connected status, the projection device generates the prompt message.

24. A projection device, comprising:

at least one player;

a sound collecting device, configured to receive an original instruction corresponding to an original control code; and an allocation module, coupled to the player and the sound collecting device, and configured to determine whether the original control code meets at least one necessary parameter, wherein in response to the original control code meeting the at least one necessary parameter, the allocation module is configured to enable a player in the at least one player to play a media file of at least one media file according to the original control code, wherein in response to the original control code not meeting the at least one necessary parameter, the allocation module generates a supplementary control code, and the allocation module is configured to enable the player of the at least one player to play the media file of the at least one media file according to at least one of the original control code and the supplementary control code.

* * * * *